United States Patent [19]
Kahaney

[11] Patent Number: 5,386,254
[45] Date of Patent: Jan. 31, 1995

[54] SUNGLASSES ASSEMBLY

[76] Inventor: Alan Kahaney, 2212 Place Monaco, Del Mar, Calif. 92014

[21] Appl. No.: 93,563

[22] Filed: Jul. 19, 1993

[51] Int. Cl.$^6$ .................................................. G02C 1/00
[52] U.S. Cl. ......................................... 351/60; 351/76; 351/80; 351/85; 351/86; 351/116; 351/121; 351/137; 351/153; 351/158
[58] Field of Search ........................ 351/41, 47, 44, 57, 351/60, 76, 80, 111, 112, 116, 118, 119, 121, 136, 137, 138, 158, 85, 86, 69, 156, 153

[56] References Cited

U.S. PATENT DOCUMENTS

| | | | |
|---|---|---|---|
| 2,529,068 | 11/1950 | Bernheim | 351/60 |
| 2,529,110 | 11/1950 | Splaine | 351/60 |
| 3,233,249 | 7/1963 | Baratelli et al. | 351/44 |
| 4,925,292 | 5/1990 | Negishi | 351/137 |
| 4,951,322 | 8/1990 | Lin | 351/138 |
| 4,955,708 | 9/1990 | Kahaney | 351/118 |
| 5,007,727 | 4/1991 | Kahaney et al. | 351/47 |
| 5,059,017 | 10/1991 | Bennato | 351/121 |
| 5,249,001 | 9/1993 | Jannard | 351/111 |

FOREIGN PATENT DOCUMENTS 209595 6/1960 Austria ................................. 351/92

Primary Examiner—William L. Sikes
Assistant Examiner—Huy Mai
Attorney, Agent, or Firm—Charles C. Logan, II

[57] ABSTRACT

A multi-combination sunglasses assembly having a one-piece sunglasses lens, an elongated lens support frame, left and right temple members, and hinge members for detachably securing the temple members to the respective left and right ends of the lens support frame. The temple members are designed so that they can be adjusted for different sized heads while maintaining the ability to positively secure them to the wearer's head. One version has flexible temple members that have hook and loop fastening material secured to their ends so that they may be wrapped entirely around the wearer's head. A second version has adjustable temple members having a bendable ear engaging portion. The nose-pad assembly has structure that allows the sunglasses to be adjusted vertically to suit different shaped faces.

6 Claims, 2 Drawing Sheets

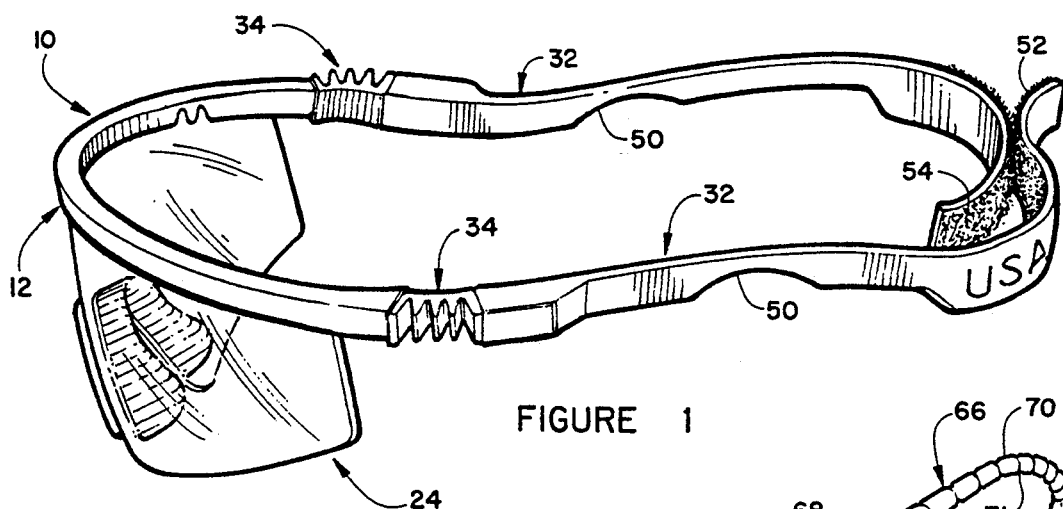
FIGURE 1
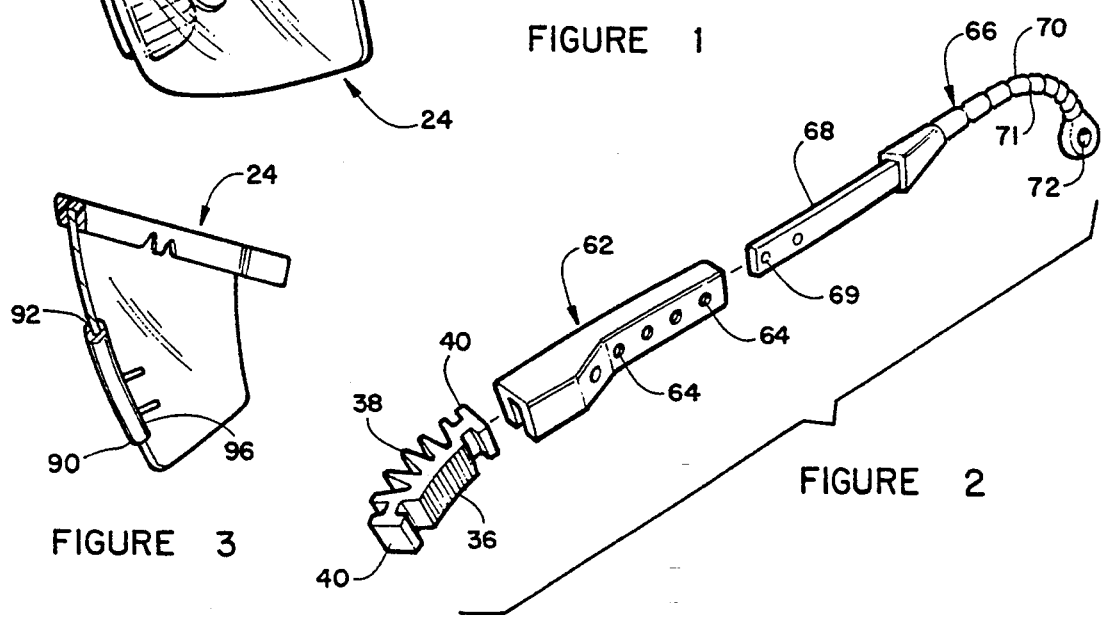
FIGURE 2
FIGURE 3
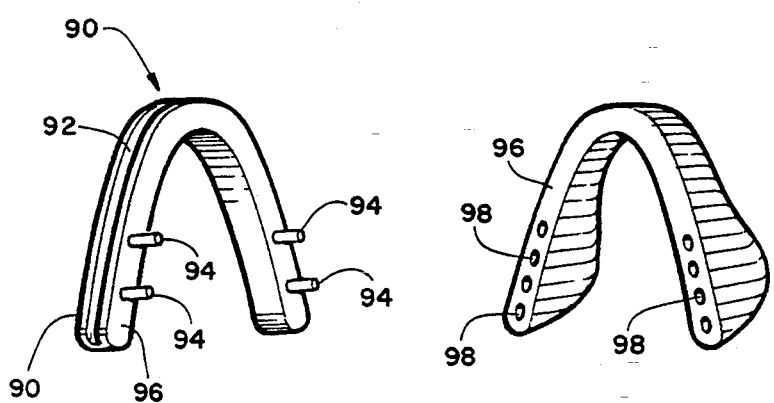
FIGURE 4
FIGURE 5

SUNGLASSES ASSEMBLY

BACKGROUND OF THE INVENTION

The invention relates to sunglasses and more specifically to a multi-combination sunglasses assembly.

Presently there are many various forms of sunglasses that have a one-piece lens. Often these are used by highly active individuals competing in various sports. This causes the sunglasses to fall or be knocked off the wearer's face occasionally and sometimes the temple members are broken and/or the face of sunglasses are fractured. When these sunglasses are not in use, they are normally folded with the temple members crossed against each other and oftentimes they are subjected to forces that fracture the binge or temple member. Also, sunglasses are not sized to fit different sized faces and heads. The temples of conventional sunglasses are also difficult to wear under a helmet.

It is an object of the invention to provide a novel multi-combination sunglasses assembly that has a nosepiece assembly that is adjustable to fit different sized faces.

It is also an object of the invention to provide a novel combination sunglasses assembly that has unique hinge members having tongue portions formed on their respective front and rear ends that are detachably received in vertical slots formed in the respective front ends of the temple members and the ends of the lens support frame.

It is another object of the invention to provide a novel multi-combination sunglasses assembly that provides novel temple member structure for positively securing the sunglasses to the head of the wearer.

It is an additional object of the invention to provide a novel multi-combination sunglasses assembly that has hinge members that can resist breakage due to their flexible nature and the fact they are made of plastic material.

It is also an object of the invention to provide a novel multi-combination sunglasses assembly that has a unique structure for snapping the lens into the lens support frame.

It is a further object of the invention to provide a novel multi-combination sunglasses assembly that appeals to the younger generation.

SUMMARY OF THE INVENTION

The novel multi-combination sunglasses assembly has an elongated lens support frame having a slot formed in its bottom surface. A one-piece sunglasses lens is detachably received in that slot. A nose-pad assembly is detachably secured in the nose-pad cutout portion of the sunglasses lens. The lens support frame is preferably made of a lightweight plastic material.

The temple members have their front ends detachably connected to the respective left and right ends of the lens support frame by hinge members. These hinge members are preferably made of plastic material and they are resilient. They have a vertically extending tongue portion formed at their front end and also their rear end. These tongue portions are detachably received in vertical slots in the front end of the temple members and the ends of the lens support frame. These hinge members have a smooth curved inner surface and they have a bellows shaped outer surface having a relieved area formed by vertical notches. The hinge members function to accommodate persons having a wide range of different head widths while maintaining a positive position on the wearer's head.

The unique screwless hinge has many advantages. It avoids the loosening and/or loss of screws which is a great nuisance. This allows the sunglasses to be quickly assembled and doesn't require the use of tools. The hinges allow not only for the attachment of temples, but also for a close fitting head strap which gives positive retention and fits under helmets. The hinges additionally allow for comfort, yet resiliently shapes the glasses onto any adult size head.

The lens support frame has a groove formed in its bottom surface thereby forming a front wall and a rear wall. A pair of laterally spaced relieved portions are formed in the rear wall and a finger extends downwardly from each of the relieved portions. A protrusion extends from the rear surface of each of the fingers. The sunglasses lens has a pair of laterally spaced recesses in its rear surface adjacent to its top edge that detachably receive the protrusions on the fingers of the lens support frame. These fingers have a predetermined degree of flexibility that allows the protrusion to snap in and out of the recesses on the rear surface of the lens.

The temple members have structure that allows them to be positively secured to the wearer's head. One of the versions have temple members made of an elongated strip of flexible plastic material and they have hook and loop fastening material secured to their rear ends by an adhesive. This allows the length of the respective temple members to be lengthened or shortened as they wrap around the wearer's head to positively grip the sunglasses on the wearer. A second version has temple members formed with an adjustable length tubular front connection portion that telescopically receives the rear temple portion. The rear temple portion has a bendable ear engaging portion that allows it to be bent securely around the wearer's ears.

The novel multi-combination sunglasses assembly also has an adjustable nose piece assembly. It has a front half member with multiple vertically oriented recesses. It also has a rear half member with a plurality of vertically spaced fingers. These fingers can be put into different vertical recesses on the front half member thereby allowing for adjustment of the sunglasses vertically on the wearer's face.

DESCRIPTION OF THE DRAWING

FIG. 1 is a front perspective view of the novel multi-combination sunglasses assembly;

FIG. 2 is an exploded perspective view of an alternative embodiment temple member structure;

FIG. 3 is a cross sectional view taken along lines 3—3 of FIG. 1;

FIG. 4 is a rear elevation view of the rear half member of the nose-pad assembly;

FIG. 5 is a rear perspective view of the front half member of the nose-pad assembly;

DESCRIPTION OF THE PREFERRED EMBODIMENT

Figure 6:
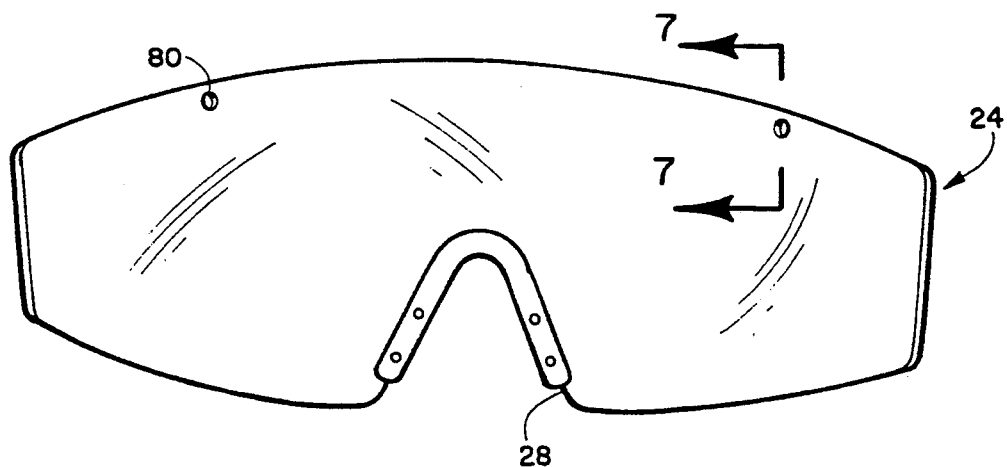
FIG. 6 is a rear perspective view of the sunglasses lens.
Figure 7:
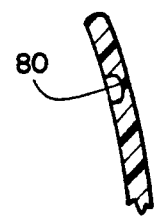
FIG. 7 is a cross sectional view taken along lines 7—7 of FIG. 6.
Figure 8:
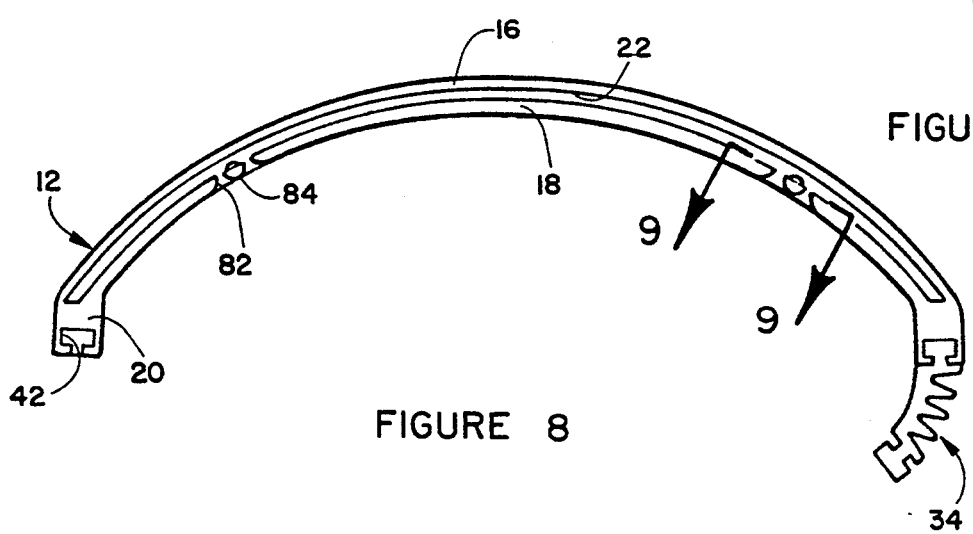
FIG. 8 is a bottom plan view of the lens support frame.
Figure 9:
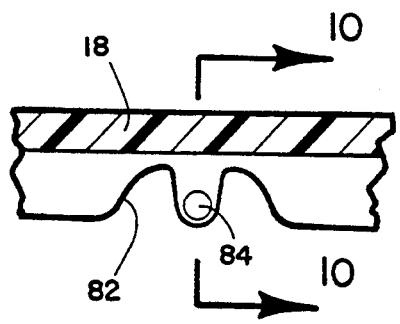
FIG. 9 is a cross sectional view taken along lines 9—9 of FIG. 8.
Figure 10:
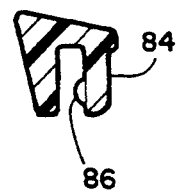
FIG. 10 is a cross sectional view taken along lines 10—10 of FIG. 9.

The novel combination sunglasses assembly is generally designated numeral 10 and it will be described by referring to FIGS. 1–10 of the drawings.

The multi-combination sunglasses assembly 10 has an elongated lens support frame 12 having a right end and a left end. It has a top wall 14, a front wall surface 16, a rear wall surface 18, and a bottom surface 20 having a slot 22 formed therein. A one-piece sunglasses lens 24 is detachably secured in slot 22. Sunglasses lens 24 has a nose-pad cutout portion 28 that removably receives a nose-pad assembly 30.

In the embodiment illustrated in FIG. 1, a pair of temple members 32 are secured by hinge members 34 to the lens support frame 12. The hinge members are made of a resilient plastic material and they are best understood by referring to FIG. 2. Each has a smooth inner surface 36 and a bellows-shaped outer surface 38 that is formed by relieved vertical notches therein. The opposite ends of the hinge members have a T-shaped protrusion or tongue portion 40 at each of its ends that are detachably received in the respective vertical T-shaped grooves or slots 42 and 44. Between the front and rear end of the temple members 32, are arcuate recesses 50 that are positioned to rest on the top edge of the wearers ears. The rear ends of the temple members have strips 52 and 54 of hook and loop fastener material glued to their respective mating surfaces. This allows the temple members to be adjusted for different sized heads.

An alternative embodiment temple member 60 is illustrated in FIG. 2. It has an adjustable length tubular front connection portion 62 having a plurality of apertures 64 spaced along its inner wall. The rear temple portion 66 has a shank portion 68 that is telescopically received in connection portion 62. The protrusion 69 can mate with any of the apertures 64 in order to vary the length of the temple member. The rear of temple portion 66 has a bendable ear engaging portion 70 having a plurality of annular grooves 71 that assist in bending this member around the wearer's ears. An eyelet 72 can receive the clip-on end of a eyeglass holder.

The novel structure for detachably securing the lens 24 to the lens support frame 12 is best illustrated in FIG. 6–10. Sunglasses lens 24 has a pair of recesses 80 formed in its rear surface. The rear wall 18 of lens support frame 18 has a semi-circular relieved portion 82 formed therein with a resilient finger 84 extending downwardly therefrom. The rear of finger 84 has a protrusion 86 that is detachably received in recess 80 of sunglasses lens 24.

Nose-pad assembly 30 is best understood by referring to FIGS. 3–5. It has a front half member 90 having a groove 92 in its lateral surfaces and a plurality of fingers 94 extending rearwardly therefrom. Rear half member 96 has a plurality of vertically spaced recesses 98 that detachably receive fingers 94.

What is claimed is:

1. A sunglasses assembly comprising:

an elongated lens support frame having a left end and a right end, a front surface, a rear surface, a top surface and a bottom surface;

a one-piece sunglasses lens having a top edge, a bottom edge, a front surface and a rear surface, said bottom edge having a nose-pad cutout portion for detachably receiving a nose-pad assembly;

means for detachably connecting the top edge of said sunglasses lens to the bottom surface of said lens support frame comprising a groove in the bottom surface of said lens support frame for detachably receiving said sunglasses lens, said groove thereby forming a front wall having a bottom edge and a rear wall having a bottom edge in said lens support frame, a pair of laterally spaced relieved portions are formed in said rear wall and extend upwardly from its bottom edge, a finger extends downwardly from each of said relieved portions and said fingers have a front surface and a rear surface, a protrusion extends from the front surface of each of said fingers, said sunglasses lens has a pair of laterally spaced recesses in its rear surface adjacent its top edge that detachably receives the respective protrusions on the fingers of said lens support frame;

a left temple member having a front end and a rear end;

a right temple member having a front end; and means for detachably connecting the front ends of said respective temple members to the respective left and right ends of said lens support frame.

2. A sunglasses assembly as recited in claim 1 wherein said means for detachably connecting said temple members to said lens support frame comprises a pair of resilient hinge members each having a front end, a rear end, a curved inner surface and a bellows-shaped outer surface.

3. A sunglasses assembly as recited in claim 2 wherein a T-shaped protrusion is formed at the front and rear end of said hinge members, said lens support frame having a T-shaped groove at its left and right ends for detachably receiving the T-shaped protrusions on said hinge members.

4. A sunglasses assembly as recited in claim 2 wherein said hinge members are made of plastic material.

5. A sunglasses assembly as recited in claim 2 wherein said temple members each have an adjustable length tubular front connection portion that telescopically receives the shank portion of a rear temple portion.

6. A sunglasses assembly as recited in claim 1 further comprising a nose-pad assembly having means for adjusting the height of said sunglasses on the wearer's nose.

* * * * *